United States Patent
Guilley et al.

(10) Patent No.: US 10,691,855 B2
(45) Date of Patent: Jun. 23, 2020

(54) DEVICE AND METHOD FOR DETECTING POINTS OF FAILURES

(71) Applicant: SECURE-IC SAS, Cesson-Sévigné (FR)

(72) Inventors: Sylvain Guilley, Paris (FR); Théophile Boue, Servon sur Vilaine (FR)

(73) Assignee: SECURE-IC SAS, Cesson-Sévigné (FR)

( * ) Notice: Subject to any disclaimer, the term of this patent is extended or adjusted under 35 U.S.C. 154(b) by 175 days.

(21) Appl. No.: 15/937,153

(22) Filed: Mar. 27, 2018

(65) Prior Publication Data

US 2018/0285483 A1    Oct. 4, 2018

(30) Foreign Application Priority Data

Apr. 4, 2017  (EP) ..................................... 17305406

(51) Int. Cl.
*G06F 17/50*    (2006.01)
*G06F 30/3323*  (2020.01)
(Continued)

(52) U.S. Cl.
CPC ..... *G06F 30/3323* (2020.01); *G01R 31/3185* (2013.01); *G01R 31/31719* (2013.01);
(Continued)

(58) Field of Classification Search
CPC ........................... G06F 17/504; G06F 17/5068
(Continued)

(56) References Cited

U.S. PATENT DOCUMENTS

| | | |
|---|---|---|
| 4,763,289 A | 8/1988 | Barzilai et al. |
| 5,748,497 A | 5/1998 | Scott et al. |

(Continued)

OTHER PUBLICATIONS

European Search Report for 173054065 dated Oct. 13, 2017.

*Primary Examiner* — Suchin Parihar
(74) *Attorney, Agent, or Firm* — Meagher Emanuel Laks Goldberg & Liao, LLP

(57) ABSTRACT

Devices, methods, and computer program products for detecting Points Of Failures in an integrated circuit (IC) are provided. The integrated circuit device is described by a structural description (2) comprising a plurality of elements, the elements representing cells and wires interconnecting the cells, the structural description further comprising portions representing a set of sensitive functional blocks (16), each sensitive functional block comprising one or more inputs, at least one sensitive output, and a set of elements interconnected such that the value of the sensitive output is a Boolean function of the input values of the sensitive functional block. The detection device (100) comprises:
- a selection unit (101) configured to iteratively select a n-tuple of elements in at least the portions of the netlist corresponding to said sensitive functional blocks,
- a testing unit (104) configured to test each selected n-tuple of elements, the testing unit being configured to:
  modify said selected n-tuple of elements from an initial state to a testing state;
  determine if the derivative of the Boolean function associated with each sensitive functional block is equal to zero.

The detection device (100) is configured to detect that said n-tuple represents a Point Of Failure of order n in the integrated circuit (IC) device if the derivative of the Boolean function associated with said sensitive functional block is equal to zero.

15 Claims, 7 Drawing Sheets

(51) Int. Cl.
*G01R 31/3185* (2006.01)
*G01R 31/3183* (2006.01)
*G01R 31/317* (2006.01)
*G06F 30/39* (2020.01)
*G06F 30/327* (2020.01)
*G06F 111/04* (2020.01)
*G06F 111/20* (2020.01)

(52) U.S. Cl.
CPC ........... *G01R 31/318314* (2013.01); *G01R 31/318588* (2013.01); *G06F 30/327* (2020.01); *G06F 30/39* (2020.01); *G06F 2111/04* (2020.01); *G06F 2111/20* (2020.01)

(58) Field of Classification Search
USPC .......................................................... 716/103
See application file for complete search history.

(56) References Cited

U.S. PATENT DOCUMENTS

| | | | |
|---|---|---|---|
| 6,134,689 A | 10/2000 | Mateja et al. | |
| 2001/0028256 A1* | 10/2001 | Hayashi | G01R 31/312 |
| | | | 324/754.21 |
| 2007/0113127 A1* | 5/2007 | Nonaka | G06F 30/327 |
| | | | 714/724 |
| 2010/0293413 A1* | 11/2010 | Borjon | G03F 1/36 |
| | | | 714/35 |
| 2016/0239647 A1 | 8/2016 | Johnson et al. | |

* cited by examiner

DEVICE AND METHOD FOR DETECTING POINTS OF FAILURES

TECHNICAL FIELD

The invention generally relates to electronic circuits and in particular devices and methods for detecting Points Of Failure in such circuits.

BACKGROUND

Integrated circuits (ICs) used in a number of embedded devices such as smartcards or secure elements can contain a secret security key and carry out secret data.

Integrated circuits can be vulnerable to attacks on the physical structure of the integrated circuit device (such as a chip, semiconductor device, etc.).

Integrated circuits may include a number of protection blocks to ensure protection against attacks, such as one or more sensors which aim at detecting possible attacks. For example, Integrated Circuits may comprise sensors for detecting physical attacks, including but not limited to probing attacks or perturbation attacks, a shield, a digital sensor, etc. Integrated circuits may be configured to detect cyber-attacks, using for example CFI (Control Flow Integrity) verification.

The structure of an integrated circuit often contains certain points (referred to as Single Points Of Failure or SPOF) that correspond to critical elements of the Integrated Circuit whose failure can result in stopping the whole Integrated Circuit from operating in a secure way.

Single-Points Of Failures are design weaknesses which, if existing and subsequently localized by an attacker, can jeopardize the security of the integrated circuit.

An Integrated circuit comprises a number of sensitive functional blocks, such as protection blocks, which produce critical signals (e.g. alarms) when they detect an abnormal operation of the Integrated Circuit. If an alarm is a single signal (corresponding to one wire), then it represents a "single Point Of Failure" (SPOF). Indeed, an attacker can cut this vulnerable "wire" corresponding to the SPOF to cancel the alarm and thus gain access to all the secrets contained in the "edited" circuit as well as to the instances of the same product line sharing the same secrets, using a tool like a Focused Ion Beam (FIB). Still, circuit edition with FIB is often difficult, because nets are not easily reached by the tool (e.g. owing to routing congestion on top of it), and because the FIB is not fully reliable. Protection against FIB attacks thus usually assumes that an attacker is only able to "edit" (i.e., cut, open, or tie to '0' or '1') a limited number of nets.

A major challenge of secure integrated circuits is accordingly detection and elimination of single Points Of Failures in circuits. SPOFs represent the "weakest link" in the security chain of Integrated Circuits. The fact that a complex detection IP might be bypassed by a single FIB cut represents important security vulnerability. The effect of a FIB can be to open (i.e. disconnect) a net, or even to tie it to '0' or '1'. Indeed, the FIB tool is also able to repair circuits, and in that respect, it can be used to force the value of arbitrary nets.

It is known to diversify alarms, typically by making them redundant according to the following approaches:
  simple duplication (or multiplication) of the signals,
  encoding of the signals so that alterations can be themselves detected,
  using multiple independent tests (e.g. in a shield, different areas are checked independently).

When manually implementing the multiplication of alarm signals, it is possible that some of them be forgotten. Or, even if it is properly implemented, it can happen that the synthesizer optimizes the diversity away. For instance, the various alarm signals can be refactored so that a new single Point Of Failure re-appears.

Existing approaches are based on Automatic Test Patterns Generation (ATPG). Such solutions have been proposed to test integrated circuits in order to identify SPOF using test vectors. For example, US patent referenced 6134689A describes a method of testing an integrated circuit containing a logic device, the method including the steps of identifying a first test vector corresponding to a test failure resulting from testing of the logic device, converting the first test vector from an input pin format into state data associated with the logic device, and searching the state data to identify a set of last shift transitions.

Other solutions are based on simulations and lie on post-productions foundry tests. However, even if IC process is realized in the cleanest and most verified industry conditions and even if some dusts and process variations are tolerated, physical errors on die can still occur, due for example to lower wafer quality on periphery, dusts during masking or patterning, wafer dicing. Such existing post-production foundry tests verify the signals continuity of the die, through scan-chain for example, according to plan tests. These plan tests are generated thanks to conventional software techniques (such as mutation testing) and only meet validation criteria (such as statement coverage, branch coverage, etc.). The plan tests mainly consist in revealing whether an input or output of a gate is stuck to an undesired level or whether a metal wire or via has been corrupted during the several fabrication phases without taking into account the pertinence of the tested signal.

There is accordingly a need to detect Points Of Failure in an IC device.

SUMMARY

In order to address these and other problems, there is provided a device for detecting Points Of Failure in an integrated circuit (IC), the integrated circuit being described by a structural description of the integrated circuit comprising a plurality of elements, the elements representing cells and wires interconnecting the cells, the structural description of the integrated circuit further comprising portions representing a set of sensitive functional blocks, each sensitive functional block comprising one or more inputs, at least one sensitive output, and a set of elements interconnected such that the value of the sensitive output is a Boolean function of the input values of the sensitive functional block. The device comprises:
  a selection unit configured to iteratively select a n-tuple of elements in at least the portions of the structural description of the integrated circuit corresponding to the sensitive functional blocks,
  a testing unit configured to test each selected n-tuple of elements, the testing unit being configured to:
  modify the selected n-tuple of elements from an initial state to a testing state;
  determine if the derivative of the Boolean function associated with each sensitive functional block is equal to zero,
  the device being configured to detect that the n-tuple represents a Point Of Failure of order n in the integrated circuit (IC) device if the Boolean function associated with the sensitive functional block is equal to zero.

In an embodiment, the testing unit may be configured to modify the selected n-tuple of elements by performing at least an action in the group consisting of: removing the n-tuple of elements, and maintaining the n-tuple of elements to a predefined binary value.

In an embodiment, the testing unit may be configured to store information related to the n-tuple of elements, if the derivative of the Boolean function associated with the sensitive functional block is equal to zero.

The testing unit may be configured to modify back the selected n-tuple of elements from the testing state to the initial state, before selection of another n-tuple of elements.

The device may comprise a data structure for storing information related to the tested n-tuple elements, the data structure comprising an entry for each n-tuple element.

The information related to each n-tuple elements may comprise the path of each n-tuple element, in the structural description of the integrated circuit.

In an embodiment, the device may comprise an injector configured to determine the type of each sensitive functional block comprised in the structural description of the integrated circuit, the injector being configured to insert testing elements in the portions of the structural description of the integrated circuit corresponding to a sensitive functional block depending on the type of the sensitive functional block, which provides a modified structural description of the integrated circuit, the injector being configured to transmit the modified structural description to the selection unit for the selection of a n-tuple element.

In an embodiment, if the sensitive functional block represents a digital sensor comprising chain of buffers, the injector may be configured to force a state configured to invert the chain of buffers in the portion of the structural description corresponding to the sensitive functional block.

The selection unit may comprise a parser to parse at least the portions of the structural description corresponding to the sensitive functional blocks.

The selection unit may be configured to parse the portions of the structural description corresponding to the sensitive functional blocks by applying a breadth-first traversal to the portions.

The structural description may be chosen in the group consisting of a Gate Level Netlist, an IC Layout description, and a Transistor Level Netlist.

In an embodiment, the designing apparatus for designing an Integrated Circuit device, the apparatus comprising:
a behavioural description generator configured to determine a behavioural description of the IC device from a model of the IC device;
a Gate Level Netlist generator configured to generate a Gate Level Netlist from a model of the behavioural description;
a placer-router configured to place and route cells to determine a physical layout of the IC device;
a transistor level Netlist generator configured to extract a Transistor Level Netlist comprising transistors and connections from the layout, The apparatus comprises a device according to any of the preceding embodiment for detecting the Points Of Failures from a structural description derived from at least one of the gate level Netlist, the layout description file, the transistor level Netlist, the design apparatus being configured to modify the model in response to the detection of at least one Point Of Failure.

In an embodiment, there is provided an integrated circuit verification apparatus for verifying at least one Integrated Circuit, the apparatus comprising:
a structural description extractor configured to extract a structural description of the IC device,
the apparatus comprising a device according to any of the preceding embodiment for detecting Points Of Failures in the Integrated Circuit from the extracted description file.

In an embodiment, a method is provided for detecting Points Of Failure in an integrated circuit (IC), the integrated circuit device being described by a structural description comprising a plurality of elements, the elements representing cells and wires interconnecting the cells, the structural description further comprising portions representing a set of sensitive functional blocks, each sensitive functional block comprising one or more inputs, at least one sensitive output, and a set of elements interconnected such that the value of the sensitive output is a Boolean function of the input values of the sensitive functional block, the method comprising at least one iteration of the following steps:
selecting a n-tuple of elements in at least the portions of the netlist corresponding to the sensitive functional blocks,
testing each selected n-tuple of elements, the testing step comprising:
modifying the selected n-tuple of elements from an initial state to a testing state;
determining if the derivative of the Boolean function associated with each sensitive functional block is equal to zero,
the method detecting that the n-tuple represents a Point Of Failure of order n in the integrated circuit (IC) device if the Boolean function associated with the sensitive functional block is equal to zero.

There is further provided a computer program product for detecting Points Of Failures in an integrated circuit (IC), the integrated circuit device being described by a structural description comprising a plurality of elements, the elements representing cells and wires interconnecting the cells, the structural description further comprising portions representing a set of sensitive functional blocks, each sensitive functional block comprising one or more inputs, at least one sensitive output, and a set of elements interconnected such that the value of the sensitive output is a Boolean function of the input values of the sensitive functional block, the computer program product comprising:
a non-transitory computer-readable storage medium; and
program code stored on the non-transitory computer-readable storage medium that, when executed by one or more processors, causes the one or more processors to:
select a n-tuple of elements in at least the portions of the structural description corresponding to the sensitive functional blocks,
test each selected n-tuple of elements, the testing step comprising:
modifying the selected n-tuple of elements from an initial state to a testing state;
determining if the derivative of the Boolean function associated with each sensitive functional block is equal to zero,
the one or more processors being further caused to detect that the n-tuple represents a Point Of Failure of order n in the integrated circuit (IC) device if the Boolean function associated with the sensitive functional block is equal to zero.

Embodiments of the invention can allow enhancing the security of a trusted circuit by reliably detecting Points Of Failure, during manufacturing of an integrated circuit. In other applications, embodiments of the invention can allow detection of Points Of Failure in one or more Integrated Circuits after their manufacturing, for example to check if a founder has modified the layout of the circuit to lower its dependability/security prior to fabrication, in a circuit evaluation application.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the present invention provide an improved method and device for detecting Points Of Failure (also referred to hereinafter as "POF") in an Integrated Circuit (IC) from a structural description of the Integrated Circuit (IC) (also referred to hereinafter as an "IC device"). The Points Of Failure may be Single Points of Failure (SPOF) or Multiple Points of Failure.

A Single Points of Failure (SPOF) refers to a point in a circuit such that, if a failure happens at that point of the circuit, the whole circuit fails.

A Multiple Point of Failure (MPOF) refers to several points of the circuit such that if failures occur at at least two of these points, the whole circuit fails.

As used herein, the term "Points of Failure of order n", with n being an integer greater or equal to one (1), will be used to designate one or more Points Of Failure (Single Points of Failure if n=1 or Multiple Point of Failure if n is strictly greater than 1) such that if failures happen at all of these n points of the circuit, the whole circuit fails.

Figure 1:
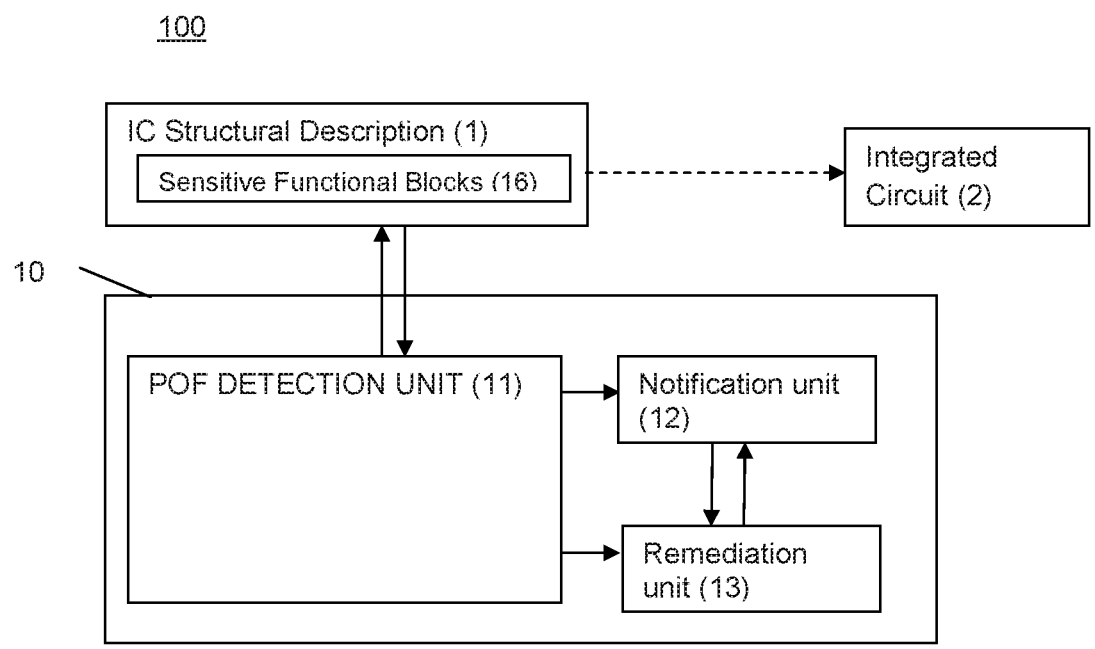
FIG. 1 is a block diagram of a Point Of Failure detection device, according to certain embodiments.

FIG. 1 represents a cross-sectional view of a POF detection system 100 comprising a POF detection device 10 configured to detect Points Of Failure of order n in an Integrated Circuit (IC) device 1 from a structural description of the integrated circuit device 1, with n≥1 (n greater than 1). The structural description of the integrated circuit device comprises a plurality of elements, the elements representing cells and wires interconnecting the cells.

The structural description of the IC device may be the IC netlist or any structural description of the Integrated Circuit derived from such netlist, such as a refined structural description of the IC device generated during the design phase of the IC device (refined netlist such as the Gate Level Netlist, the Layout description file, Transistor Level Netlist, etc.).

The following description of some embodiments will be made mainly with reference to a structural description of the IC device of the Netlist type, although the skilled person will readily understand that the invention similarly applies to any structural description of the IC device such as for instance a refined Netlist (e.g. Transistor Level Netlist or Layout description file). In the following description, the structural description of the integrated circuit device will be thus referred to as a "Netlist".

The POF detection device 10 may be used during the manufacturing of the IC device in any step of the designing phase which provides a structural description of the IC device (e.g. netlist or refined netlist), such structural description being used by the POF detection device to detect POF. If no POF is detected, such structural description of the IC device 1 may then be used to finalize the manufacturing of the IC device 2 in a foundry.

Alternatively, the POF detection device 10 may be applied on a manufactured IC device, to evaluate or test the IC device, the POF detection device 10 using a structural description extracted from the IC device (such as a Netlist) to determine if the IC device comprise POF. For example, in the context of dependable computing, it is required to know whether a given IC device has a SPOF or more generally a MPOF of low multiplicity. Indeed, an IC device is not dependable if:

a natural fault occurring at the SPOF generates a malfunction, hence safety issue, and/or a crafter fault injected by an attacker can bypass a security mechanism.

Accordingly, it may be needed to check that no Point Of Failure is present in an Integrated Circuit.

It should be noted that a Point Of Failure can be introduced while the design is fabricated, if the founder is untrustworthy and happens to modify the layout to lower its dependability/security prior to fabrication. Evaluating an IC device after its manufacturing allows to detect such vulnerability of an IC device.

In another example, it may be needed to verify the absence of Points Of Failure on «off-the-shield» integrated circuits, prior to provisioning the Integrated Circuit. In such application, the POF detection device 10 may be used by a third-party (possible buyer) by extracting the netlist of the IC device that is intended to be bought (for example, by conducting a reverse-engineer of a sample of the integrated circuit such as by delayering, applying confocal microscopy or X-ray tomography to the sample), and applying the POF detection device on such Netlist (as the structural description of the IC device). If a POF is detected, the third-party can ask for a redesign of the integrated circuit to remove the POF, or choose another integrated circuit, preferably positively tested POF-proof.

The following description of some embodiments will be made mainly with reference to an application of the invention to the detection of a Point Of Failure during the design process of an Integrated Circuit although the skilled person will readily understand that the following embodiments also apply similarly to evaluation of a manufactured IC device. The POF detection device 10 may comprise a POF detection unit 11 for performing the detection of Points Of Failures (SPOF or MPOF). The POF detection unit 11 may be connected to a storage unit to extract the netlist 1 of the IC device. In some embodiments, the POF detection device 10 and the storage unit storing the netlist 1 may be implemented on a same computing system. In certain embodiments, the POF detection unit 11 may access to the netlist through a distant server capable of retrieving the netlist from the storage unit (client/server connection). In a particular embodiment of the invention, the POF detection device 10 may test a netlist 1 produced in the design flow of the IC device (for example Gate Level netlist).

The netlist 1 comprises a plurality of elements representing the components of the IC device 2. The elements of the netlist comprise cells and wires interconnecting the cells. The netlist further comprises portions 16 representing a set of sensitive functional blocks of the IC device.

Each sensitive functional block 16 comprises one or more inputs, at least one sensitive output, and a set of elements interconnected such that the value of the output is a Boolean function of the input values of the sensitive functional block 16. As used herein, a "sensitive functional block" refers to a block of the IC device such that if the wire corresponding to the sensitive output is cut, the whole circuit fails.

The POF detection device 10 is configured to test selected n-tuple of elements included in portions of netlist corresponding to at least some of the sensitive functional blocks 16. For each selected n-tuple of elements, the POF detection device 10 may be further configured to modify the selected n-tuple of elements from an initial state to a testing state (i.e. "edit" the n-tuple of elements), and then determine if the Boolean function associated with at least some of the sensitive functional blocks is constant (POF test condition).

As used herein, the term "edit" refers to a modification of the initial state of n-tuple of elements in the netlist to open (i.e., disconnect) a net, or stick it to a predefined value (for example '0' or '1'), as would be performed by an attacker.

In some embodiments, the POF detection device 1 may check the POF test condition for all the sensitive functional blocks 16 of the IC device. If the Boolean function associated with each functional block is constant for the considered sensitive functional blocks, the n-tuple represents a Point Of Failure of order n in the integrated circuit (IC) device. The information related to the n-tuple of elements may then be stored. The n-tuple of elements is reinserted in the netlist before selection of another n-tuple of elements.

The POF detection system 100 thus allows detecting Points Of Failure of any order n prior to manufacturing the IC device 2. In response to the detection of one or more Points Of Failure (SPOF or MPOF) in the netlist, a model of the IC device may be refined and a new netlist may be iteratively constructed from the model, until no Point Of Failure is detected. The IC device 2 can then be manufactured from a POF free netlist.

In some embodiments, the POF detection system 100 may further comprise a notification unit 12 configured to emit a notification in response to the detection of at least one Point Of Failure. The notification may include information related to one or more detected Point Of Failure, such as a report including the path of the Point Of Failure in the IC device.

In certain embodiments, the POF detection system 100 may also comprise a remediation unit 13 configured to determine a remediation process in response to a detected Point Of Failure. In particular, such remediation unit 13 may be configured to determine recommendations related to the design of the IC device, taking into account the Point Of Failure related information reported by the notification unit 11. In some embodiments, the remediation unit 13 may be configured to apply redundancy encoding on the detected Points Of Failure. Such redundancy encoding may consist for example in duplicating the gate carrying the signal responsible for the detected Points Of Failure, or duplicating and inversing such gate so as to include some diversity. It may also consist in replacing the gate by any set of gates producing x signals correlated to the SPOF, which turns a SPOF (i.e. a MPOF of multiplicity 1) into a MPOF of multiplicity x.

The IC device 2 described by the netlist may be any IC device, in particular any embedded device or system incorporating secret data and/or requiring a level of integrity, such as a smart card, a secure device, a multimedia player, a recorder, or a mobile storage device like memory cards and hard discs. The IC device may be used in a wide range of communication and data processing applications such as in the automotive industry, in secure access solutions, in mobile phone devices, in payment domains such as banking schemes, etc.

Depending on the application, the IC device 2 may refer to:
- a manufactured IC device, a structural description (e.g. netlist) of at least a sample of the IC device being extractable from the IC device, or
- an IC device being designed (that is, intended to be manufactured), during the design process of an IC device, the structural description of the IC device (netlist) being generated during the design phase to manufacture the IC device.

The IC device 2 described by the netlist may be of any type, such as an ASIC, FPGA, GPU or CPU type circuit or the like.

A netlist 1 associated with an IC device comprises a set of cells representing electrical components of the IC device, and wires (also referred to as "lines") representing connections between the cells. Each component of the IC device includes a plurality of pins (also referred to as "terminals" or "ports") which may be interconnected to pins belonging to other cells. As used herein a "net" of a netlist refers to a wire representing an interconnection between one or more pins of cells. Nets may be associated with labels or attributes depending on the language used to write the netlist. A netlist may comprise one or more instances of a same part of the IC device. An instance is associated with a definition listing the possible connections of the instance.

A netlist may comprise one or more related lists. A netlist at least lists the pins of the electronic components in the IC device and the interconnections ("nets") that interconnect the pins of the components.

The netlist can use various types of structures and representations. For example, the netlist can be a physical or logical netlist, and instance-based or net-based netlist, a flat or hierarchical netlist (folded or unfolded hierarchical netlist).

In an embodiment, the netlist may be the Gate Level Netlist of the IC device (the cells of a Gate Level Netlist are represented by gates) or the Transistor Level Netlist generated in the IC designing process. More generally, the netlist may relate to any level of description of the circuit. The following description of certain embodiments will be made with reference to such a gate level netlist in which the cells are represented by gates, for illustration purpose only. The invention in its broader aspects is therefore not limited to the specific details, representative methods, and illustrative examples shown and described.

In the gate level netlist, the variables of the IC device are represented by elementary Boolean variables, each represented by one bit, and the gates of the IC device may comprise a set of interconnecting logic gates (e.g. AND, OR, XOR, etc.) such as:

Sequential gates which represent gates of the circuits associated with a state (such gates being generally represented by block diagrams in which the circuits are represented by a box, such as a rectangle, with a small triangle on one face), and Combinational gates (stateless gates) representing gates which are not associated with a state and can be used to carry out intermediate calculations; the values resulting from the intermediate calculations (e.g. a calculation on data or check on calculations) are not locally stored but transmitted to the sequential gates.

The outputs of sequential gates (or sequential logic) may depend on the current inputs of the gates but also on the sequence of past inputs (input history).

The logic gates may be connected by wires (also referred to as "lines") on which signals circulate. The netlist forms a logic gate interconnection graph representing the connections ("nets") between the various logic gates of an IC device. The variables stored in a sequential gate correspond to the variables that the output line of the gate can carry.

The sequential gates (also referred to as hereinafter as sequential resources) may generally comprise memory points, such as latches, but may equally comprise memories (SRAM, FLASH, etc.).

As used in the present description, the term "variable" designates a container capable of carrying data and associated with operations of reading and writing the data. This definition may correspond, for example, to a register, a gate or a set of sequential logic gates of the IC device 1. Similarly, a wire or a set of wires of the IC device 1 may also be designated by the term "variable", the reading and writing operations most often being effected by respectively measuring and modifying the voltage level carried by the line or lines.

The variables of the circuit stored in the sequential gates may be referred to also as "sequential variables". A sequential variable therefore represents an item of data contained in a sequential resource (sequential gate), i.e. stored data. Such sequential variables store the state of the calculation.

Figure 2:
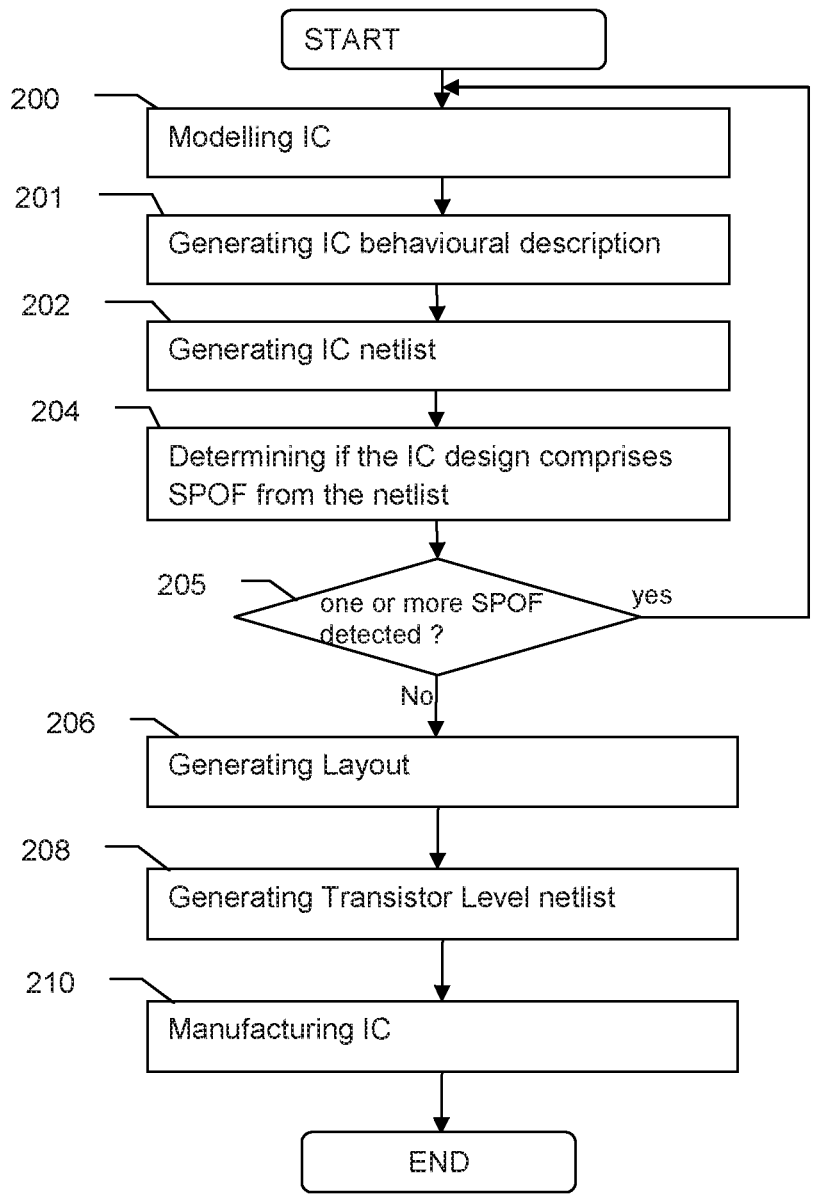
FIG. 2 is a flowchart depicting the IC designing method according to certain embodiments.

FIG. 2 is a flowchart depicting the process of fabricating an IC device 2, according to the invention.

To facilitate the understanding of some embodiments, the following description will be made mainly with reference to a SPOF detection system 100 comprising a SPOF detection device 10 using a SPOF detection unit 11 configured to detect Single Points Of Failure (i.e. Point of Failure of order n=1) in an Integrated Circuit (IC) device 2, for illustration purpose only.

The manufacturing of an integrated circuit (IC) comprises several phases resulting in a layout level design performing the functions described in a specification document, initially constructed by a designer. The layout level design is the lowest level description of the IC design. The layout level design comprises transistors represented as geometric figures with physical dimensions such as length, width and position.

At each of the intermediate steps of the IC manufacturing process, the IC is described at a different level of specificity, which includes in particular:

the "behavioural description" of the IC which is the higher level description of the IC or Register Transfer Level (RTL). In the behavioural description, the IC components (e.g. registers, functional blocks of IC) are induced by variables and data operators;

a Logic Level description of the IC (next lower level description of the IC) at the Gate Level in which the IC is represented as a set of interconnecting logic gates (e.g. AND, OR gates) and memory components (e.g. flip-flops). This representation corresponds to the Gate Level Netlist (also referred to as a gate interconnection graph). The process of translating an RTL into a Netlist is commonly referred to as "synthesis."

The manufacturing process of the IC device starts in step 200, in which a specification document is generated in a modelling phase (hardware and/or software modelling). In step 200, the IC device is modelled at a very high level, in order to validate, in quality terms, the architecture chosen for the IC device, taking into account the application constraints set for the IC device.

In step 201, the behavioural description (also referred to as "RTL description") is generated from the specification document. This provides a high-level language, in which the implementation of the circuit is described at a register transfer level in the form of sequential elements (registers, latches) and combinational logic elements corresponding to the combinations between the inputs/outputs of the sequential elements and the principal inputs/outputs of the circuit. This description may be coded using a high-level programming language (e.g. System C, VHDL, etc.).

A logic simulation step (not shown in FIG. 2) may be then performed to simulate the RTL description, using a simulator for simulating each interconnection signal in time as a function of an input stimulus. Such simulation may include simulation of the executable program associated with the processor of the circuit if it includes one. A functional verification step (not shown in FIG. 2) may be further implemented to complement the simulation, notably to simulate longer operations, to accelerate the simulation and to obtain more complete results, using languages based on modelling by assertion, to define the functional properties that the circuit must verify. The functional verification may either be implemented on the basis of random stimuli generators with automatic verification of the results relative to a reference model or use formal functional verification tools.

In step 202, a Gate Level netlist that implements the functions specified by the specification document is generated from the RTL description of the IC ("logic synthesis" step). In step 202, information is used as regards the cells that are going to be used and the way the cells will be connected to each other. The logic synthesis step aims at refining the behavioural description of the circuit to yield a structural description at the level of the logic gates (Netlist), based on a library of logic gates (for example AND, OR gates, latches, etc.) specific to the target technology and/or to the foundry that will fabricate the circuit. The logic synthesis may take into account various operating constraints. The logic synthesis may be implemented by means of an Electronic Design Automation tool, configured to transform the behavioural description in high-level language into a generic structural description (independent of the logic gate library) describing the combinational and sequential logic elements in generic form, then replacing them with elements from the logic gate library so as to meet conditions bearing on the characteristics of the circuit (e.g. logic paths of the circuits) relative to time constraints (for example, circuit operating frequency), space constraints (size of silicon) and power consumption constraints. If the elements selected do not meet the constraints, the synthesis tool can test other gates from the library. The netlist may be associated with a computer file (corresponding to the netlist) in any suitable format such as Verilog, VHDL, EDIF (acronym for "Electronic Design Interchange Format"). This file represents the instantiation of the gates from the library and their interconnection, representing the electronic circuit. Such a representation may comprise only Boolean variables, each being represented by 1 bit.

In step 204, the netlist is tested to determine if the IC design comprises SPOF (detection of SPOF). If one or more SPOFs are detected during the testing step 204, the design may be modified by iterating steps 200 to 204 until no SPOF is detected.

If no SPOF is detected at step 204 (test block 205), step 206 is performed. Step 206 comprises determining where the cells identified in step 202 are to be placed on the chip substrate of the IC device, and how the connections between the cells are to be routed on the substrate ("Place & Route" step). This step establishes the physical layout of the chip. Step 206 may take into account several constraints (such as timing, area and power) which result in netlist modifications due to optimization phases. Steps 200 to 206 may be iterated.

In step 208, a transistor level netlist may be extracted from the layout comprising transistor elements. In addition, the IC may be tested as regards certain properties (power consumption with respect to battery life for example) and the design may be further modified depending on such test results, by iterating steps 200 to 208.

In step 210, the chip corresponding to the IC device can be manufactured, based on the transistor level netlist and on a standard geometrical layout database (GDSII), in a factory (foundry).

In some embodiments, the sensitive functional blocks 16 of the IC device are protection blocks represented by portions of the netlist. The functionality of a protection block is to report any malfunction to the rest of the circuit, so that it adequate actions can be taken. Typically, the sensitive outputs of a protection block can include one or several alarms. However, a protection block may include additional sensitive outputs such as security-related status words outputs associated with the alarms. As used herein, a "protection block" refers to the part of the netlist which produces such sensitive signals related to security issue. Accordingly, each protection block corresponds to at least one critical signal of the IC device, such as an alarm signal. The following description of certain embodiments will be made with reference to sensitive functional blocks of the type protection blocks and to sensitive output represented by alarm output for illustration purpose only. However, the skilled person will readily understand that the invention applies to all type of sensitive outputs delivered by any type of sensitive functional block of an Integrated Circuit.

Each protection block comprises one or more inputs, at least one sensitive output (represented by the alarm output in the considered example), and a set of elements interconnected such that the value of the alarm output is a Boolean function of the input values of the protection block. Such Boolean function defines an activation condition of the alarm associated with the protection block.

The design of the IC device 2 may be prepared to embed a number of protection blocks to protect the IC device 2 against attacks. Each protection block corresponds to a sub-circuit of the IC device 2. In some embodiments, the protection blocks may comprise one or more sensors which aim at detecting possible attacks. For example, the IC device 2 may comprise sensors configured to detect physical attacks, such as probing attacks or perturbation attacks. The IC device 2 may also include other sensors or protection blocks such as shield, digital sensor, etc. In still other embodiments, the IC device 2 may be configured to detect cyber-attacks, such as CFI (Control Flow Integrity) verification. Those several options can be implemented alone or in combination.

Such protection blocks are configured to produce alarms at their output in response to the detection of an abnormal operation of the IC device 2. In the gate level netlist, each protection block comprises one or more signal input and at least one alarm output and is represented by a set of gates connected by wires. The values applied to the signal inputs of the protection block result in a particular value of the alarm output of the protection block. The value of the alarm output of the protection block comprises an activation value (for example "1"), which indicates an abnormal operation of the IC device (the alarm is triggered) and a deactivation value (for example "0") indicating a normal operation of the IC device. The protection block (represented by gates and wires in the netlist) thus implements an activation condition of the corresponding alarm.

In such embodiments, the POF detection device 10 may be configured to select n-tuple of elements in the netlist 2, to test the selected n-tuple by "editing" (e.g. removing or sticking to a given value) the elements of the selected n-tuple from the netlist, and to check if the POF test condition is satisfied for each protection block among at least some of the protection blocks, the POF test condition comprising checking if the Boolean function associated with each protection block is constant.

Figure 3:
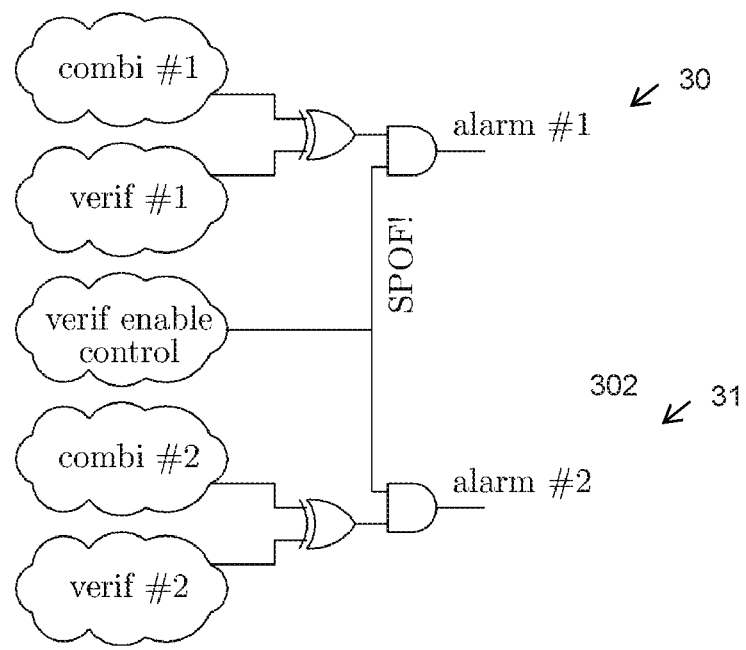
FIG. 3 represents exemplary sensitive functional blocks.

FIG. 3 shows an example of a netlist portion to be tested that corresponds to two alarm blocks of the IC device.

The first alarm block 30 of the netlist portion is made up of a first alarm output "alarm#1" whose state depends on a condition on three signal inputs "combi#1", "verif#1" and "VerifEnableControl", the condition being represented using a XOR gate 300 and an AND gate 302 as follows:

alarm#1=(combi#1 XOR verif#1) AND VerifEnableControl

The second alarm block 31 of the netlist portion is made up of a first alarm output "alarm#2" whose state depends on a condition on three signal inputs "combi#2", "verif#2" and "VerifEnableControl", the condition being represented for example by using a XOR gate 301 and an AND gate 303 as follows:

alarm#2=(combi#2 XOR verif#2) AND VerifEnableControl

The skilled person will readily understand that the above conditions are provided for illustration purpose only and that the activation condition of a protection block may depend on different signal inputs and Boolean operators.

The following description of certain embodiments will be made with reference to sensitive functional blocks corresponding to protection blocks for illustration purpose only.

Embodiments of the present invention provide a device and method for reliably detecting POFs in the IC device, prior to the manufacturing of the IC device in the foundry, using the portions of the netlist corresponding to at least some of the protection blocks of the IC device. This allows modifying accordingly the design of the IC device to prevent POF in the final IC device.

Figure 4:
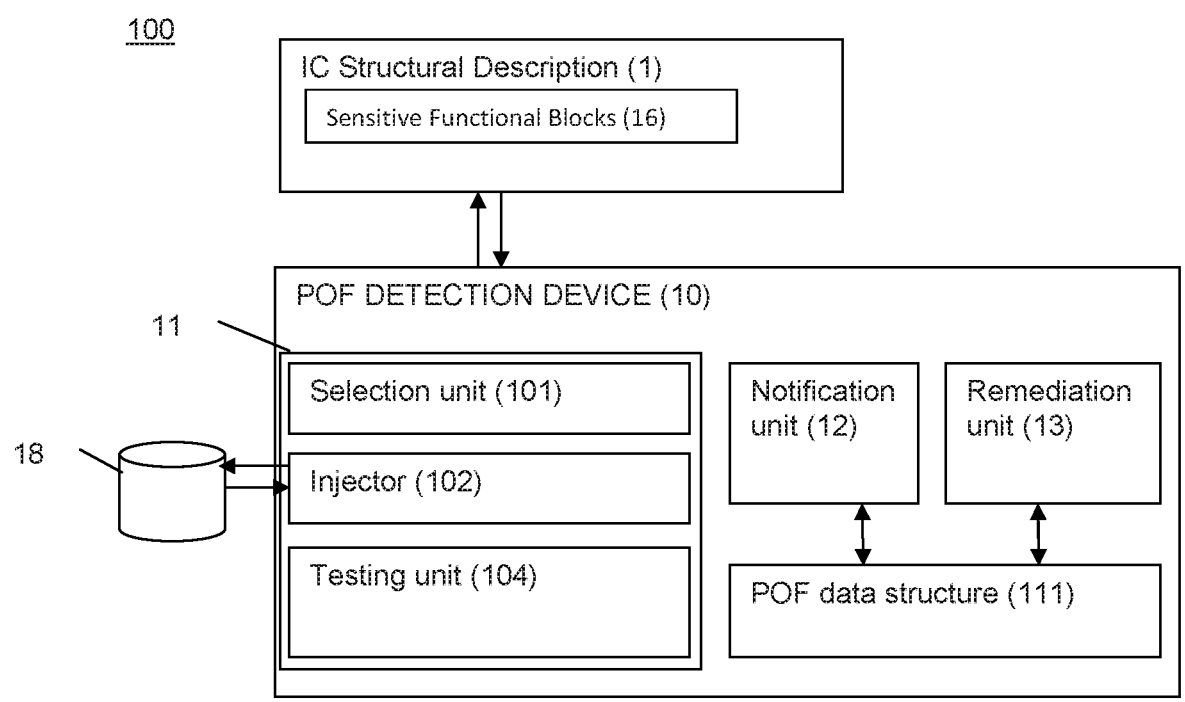
FIG. 4 is a block diagram of the Point Of Failure detection device, according to one embodiment.

FIG. 4 shows a block diagram of the SPOF detection device 10 according to some embodiments in which n=1.

In one application of the invention related to the detection of SPOF as described in FIG. 4, the selection unit 101 may be implemented as a netlist parser configured to traverse each element (gate or wire), comprised in the portions of the netlist corresponding to the protection blocks of the IC device.

Each traversed element of the netlist may correspond to either a gate or a wire of the netlist.

The netlist parser 101 may process the netlist after extraction of the netlist, using known techniques, for example as described in connection with steps 202 (Gate Level Netlist) or 208 (transistor Level netlist).

The netlist parser 101 may operate directly on the whole netlist or alternatively on selected portions of the netlist corresponding to the protection blocks of the IC device. Traversal of the selected portions of the netlist may be performed by the netlist parser 101, using a variety of known techniques. For example, the netlist parser 101 may be configured to traverse the IC device netlist, according to a breadth-first traversal for example, in embodiments where the netlist is represented by a tree (each netlist gate is then represented by a node of the tree while the connecting wires are represented by the links linking the nodes). A depth-first traversal is such that nodes at deeper levels are processed before nodes at subsequent levels.

The SPOF detection device 10 may further comprise a testing unit 104 for testing each element traversed by the netlist parser 10. More specifically, the testing unit 104 may be configured to "edit" the traversed element (for example by removing the element or maintaining it to a give value) and determine if a SPOF test condition is satisfied, the SPOF test condition being related to the value of the alarm outputs of the protection blocks related to the tested element. If the condition is satisfied, a SPOF is detected. The testing unit 104 may add an entry into a SPOF data structure 111 (for example, table or list) based on information related to the detected SPOF. In some embodiments, each entry of data structure may be associated with a detected SPOF and store the path of the detected SPOF in the netlist. An exemplary paths may be, for example: From/top/verif_enable_control to /top/alarm_#1 by/top/and_302 gate.

The testing unit 104 may be configured to check whether any signal alteration of the netlist can cause the set of alarms output to be stuck at an inactivation value (the inactive value may be for example equal to zero), in response to the edition of the tested element. In other words, the SPOF test condition comprises checking if the activation condition of the alarms is unchanged, i.e. the condition between the inactivation value (or activation value) of each alarm output and the input values of the protection block corresponding to the alarm output. For a given protection block corresponding to an alarm, the value of the alarm output of the protection block of each protection block is a Boolean function of the inputs of the protection block, the Boolean function representing the alarm condition of the protection block. In terms of Boolean functions, the SPOF test condition may then be implemented by checking if the Boolean function representing the alarm condition of each protection block is constant (the SPOF test condition being then satisfied and revealing the existence of a SPOF at the traversed element). In one embodiment, to check if the Boolean function associated with a given protection block is constant, the derivative of the Boolean function is first computed. If the derivative is equal to zero for any input value, the Boolean function is determined to be constant and the SPOF test condition is thus satisfied.

In one example based on FIG. 3, the testing unit 104 may stick the "signal/top/verif_enable_control" element at level '0' while specifying the "driving/top/combi_#1" and "/top/verif_#1" signals according to a use case where the alarm should raise. In this example, a '0' level is always detected on "/top/alarm_#1" signal.

"Editing" a tested element of the netlist refers to a single modification of the netlist. This amounts to disconnecting a wire in the netlist. The modification of netlist, thus performed to test SPOF, captures the action of an attacker.

If the condition is satisfied (i.e. activation condition of the alarm unchanged), this means that a SPOF is detected.

The SPOF detection device thus allows checking if, for all single bit modification of the netlist, there exist two different input configurations, such as the alarm is active and inactive. One of the advantages of the present invention is to detect SPOFs in the design phase of the IC device 1, thus preventing SPOFs existence in the manufactured IC device.

As shown in FIG. 4, the SPOF detection device 10 may further include a notification unit 12 configured to emit a report, after each iteration of the test performed by the testing unit 104, in response to the detection of at least one non-empty entry in the SPOF data structure (i.e. at least one SPOF is detected in the netlist). The report may be sent for example to the IC designer at the end of the test performed by the testing unit 104. In embodiments where a remediation unit 13 is used, the remediation unit 13 may determine a remediation process based on the data included in the SPOF data structure 111. The report emitted by the notification unit 12 may then include the description of the remediation process.

In some embodiments, the SPOF detection unit 11 may further include an injector 102 configured to initially insert a set of elements in the netlist that simulate the possible attacks that could be performed by an attacker. More precisely, for certain types of protection blocks which are configured to detect physical problems (such as for example a perturbation due to a laser shot, an Electromagnetic pulse, a glitch on the clock or on the power, etc.), the SPOF detection unit 11 may be configured to activate the injector 102, to increase the number of elements of the netlist 1 prior to perform the SPOF testing.

In some embodiments, the injector 102 may be configured to determine the type of each protection block comprised in the netlist, and to insert testing elements in the portions of the netlist corresponding to the protection block (or sensitive functional block more generally), depending on the identified type of the protection block. This provides a modified netlist. The injector (102) may be configured to transmit the modified netlist to the selection unit 101 for the selection of n-tuples of elements.

For example, if the protection block represents a digital sensor comprising a chain of buffers, the injector 102 may freeze a signal related to the testing element to level '0' then '1' (or inversely), this signal being configured to invert the chain of buffers in the portion of the netlist corresponding to the digital sensor.

The injector 102 may use a database 108 to identify the testing elements to be frozen in the portion of the netlist corresponding to each protection block depending on its type, as well as the connections of the testing elements with respect to the elements of the protection block.

In some embodiments, the injector 102 may be modeled in a test bench such as a simulator (e.g. HDL simulator). This offers extensions to easily tweak any signal through hierarchy directly from the top hardware module. In the example of a protection block corresponding to a digital sensor, such simulator can affect the digital sensor behavior according to specification and spy inputs, outputs and internal signals of every single entity that composes the digital sensor.

In some embodiments using a Transistor Level Netlist, the injector 102 may further use an analog/digital mixed model to simulate one or more final application attacks on the transistor level netlist, in order to detect weaknesses.

It should be noted that in some embodiments and depending on the type of the tested protection blocks, insertion of testing elements by the injector 102 may not be needed, for example for illicit behaviors which are of a logical source such as vulnerabilities in software. For instance, the injector 102 may not be caused to inject elements for a protection block of the type cyber-CPU.

Figure 5:
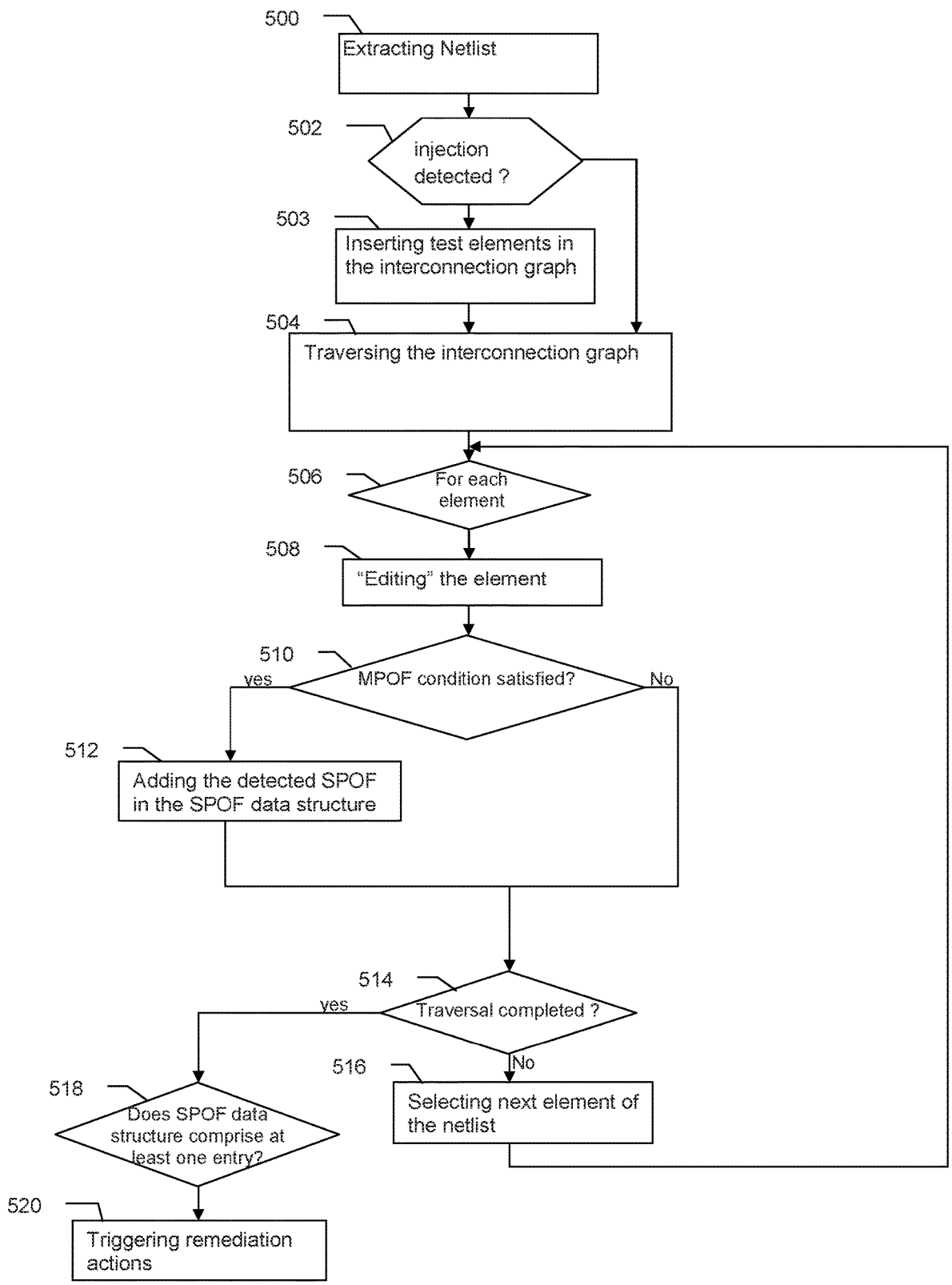
FIG. 5 is a flowchart depicting the Point Of Failure detection method according to certain embodiments.

FIG. 5 is a flowchart depicting the method of detecting Single Points, according to certain embodiments.

At step 500, the netlist is extracted.

If an injection condition is detected in step 502, test elements are injected (i.e. inserted) in the netlist in step 503. The injection condition may comprise identifying the type of each protection block and determining if testing elements are to be inserted in the portion of the netlist corresponding to the protection block from a database. If so, the testing elements may be inserted in the netlist, using placement and routing information extracted from the database.

Step 504 may be performed on the netlist, if no injection condition is detected in step 502, or on the modified netlist, after injection of test element in the netlist in step 503 if injection condition was detected in step 502. The description of the following steps of the detection method will be made simply with reference to the term "netlist", such term thus encompassing either the originally extracted netlist or the modified netlist.

In step 504, at least the portions of the netlist corresponding to the protection blocks are traversed. The following steps are performed for each traversed element (gate or wire).

For each traversed element (selected in block 506), a test of the netlist is performed. This includes:
  performing a modification of the netlist by editing the traversed element in step 508 (i.e. opening the corresponding net or maintaining the element to a predefined binary value);
  checking whether the SPOF test condition is satisfied in step 510, i.e., for each protection blocks, if the activation condition of the sensitive output of the protection block is unchanged.

Step 510 may be performed by determining if the derivative of the Boolean function representing the alarm condition of each protection block is equal to zero for any input value. If the derivative of the Boolean function is constant, then the SPOF test function is satisfied. This means that the activation conditions of the protection blocks are unchanged.

The selected n-tuple of elements may be modified back from the testing state to the initial state (state before editing the element), before selection of another n-tuple of elements.

The "modification" of the netlist (e.g. Gate Level Netlist, Transistor Level Netlist, Layout) performed in step 506 captures the action of an attacker. A SPOF is thus detected if such modification corresponding to the disconnection of a wire results in the variable associated with the traversed element to be stuck at a given value (for example either zero or one).

It should be noted that, although embodiments of the invention have been described in connection with Single Points Of Failures, it similarly applies to detection of more than two Points Of Failures and more generally to n-th Points Of Failures (n being an integer value greater or equal to one). Steps 506 and 508 will then comprise tampering n elements instead of a single element.

The detection method thus allows testing possible defects in the netlist representing the Integrated Circuit Device 2. If one or more POFs are detected (n≥1)), a remediation step may be further applied. The remediation step may consist in applying redundancy encoding on each detected POF (e.g. duplicating the gate carrying the signal responsible for the POF, or duplicating and inversing this gate to include some diversity, or replacing this gate by any set of gates producing x signals correlated to the SPOF, to transform a SPOF (i.e. a POF of multiplicity 1) into a POF of multiplicity x, etc.).

The POF detection method may be used by IC designers to validate an entire alarm circuitry specification regarding both security and integrity point of view (no single Point Of Failure of specified signals). It may not only check the propagation of specific signals but also the electronic level through the gates and the correct translation from HDL to placed and routed design (merged signals, inverter/complex gate insertions, . . . ).

Figure 6:
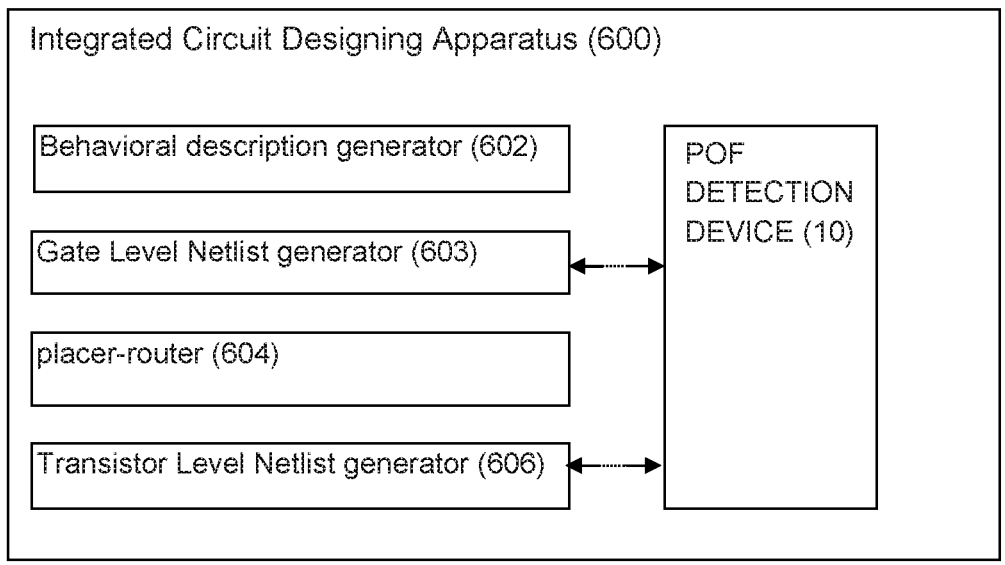
FIG. 6 is a block diagram representing an Integrated Circuit designing apparatus 600, according to certain embodiments.

In one embodiment, as represented in FIG. 6, the POF detection device 10 may be part of an Integrated Circuit designing apparatus 600 for designing an Integrated Circuit device. The designing apparatus 100 may comprise:
  a behavioural description generator 602 configured to determine a behavioural description of the IC device from a model of the IC device;
  a Gate Level Netlist generator 603 configured to generate a Gate Level Netlist from a model of the behavioural description;
  a placer-router 604 configured to place and route cells to determine a physical layout of the IC device;
  a Transistor Level Netlist generator 606 configured to extract a Transistor Level Netlist comprising transistors and connections from the layout.

Although the POF detection device 10 is represented in FIG. 6 as being part of the Integrated Circuit designing apparatus 600, the skilled person will readily understand that in alternative embodiment, the POF detection device 10 may be separate from the Integrated Circuit designing apparatus 600 and cooperate with apparatus 600 as described in relation to FIG. 6 by using the generated structural description files generated by the apparatus 600.

In such embodiment, the designing apparatus 600 may comprise the detection device 100 for detecting Points Of Failures in the Gate Level Netlist, and/or in the physical layout (described by a physical description file), and/or in the Transistor Level netlist. The IC design apparatus 100 may be configured to modify the model if at least one Point Of Failure is detected.

In another application, the POF detection method can be used upstream to evaluate manufactured Integrated Circuits and ensure that they do not comprise POF (IC evaluation applications, certification process, and the like). In such application, the POF detection device 10 may be used by an Integrated Circuit evaluation apparatus for evaluating or verifying a manufactured Integrated Circuit device. Such Integrated Circuit evaluation apparatus may comprise a structural description extractor configured to extract a structural description from at least a sample or a part of the IC device (for example the netlist), the POF detection apparatus being configured to detect Points Of Failures in the Integrated Circuit from the extracted description file.

Embodiments of the present invention can take the form of an embodiment containing both hardware and software elements.

Furthermore, the POF detection methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer system, to cause the performance of a series of operational steps.

Figure 7:
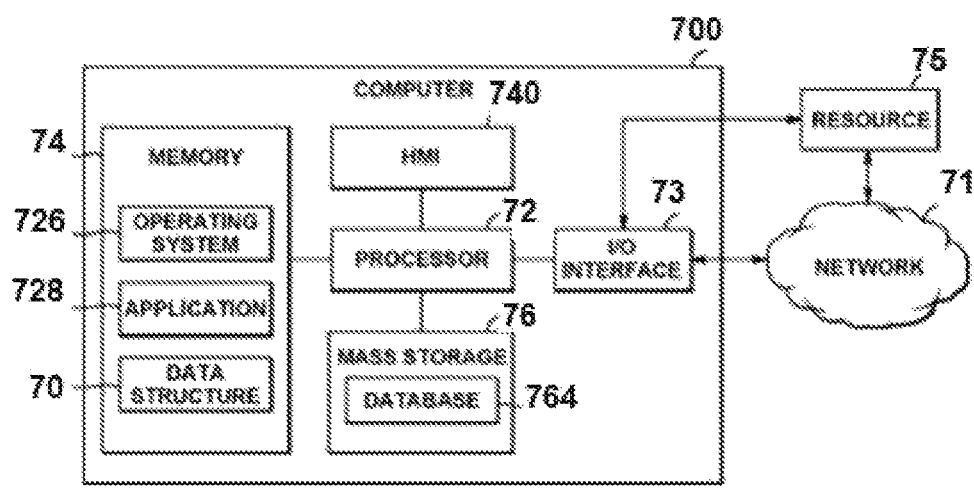
FIG. 7 a diagrammatic view of an exemplary computing system for detecting Points Of Failure, according to certain embodiments.

FIG. 7 is a simplified block diagram illustrating a general purpose programmable computer system 700, in which the SPOF detection methods may be implemented according to certain embodiments. The computer 700 may include a processor 72, a memory 74, a mass storage memory device 76, an input/output (I/O) interface 73, and a Human Machine Interface (HMI) 740. The computer 700 may also be operatively coupled to one or more external resources 75 via the network 71 and/or I/O interface 73. External resources may include, but are not limited to, servers, databases, mass storage devices, peripheral devices, cloud-based network services, or any other suitable computing resource that may be used by the computer 700. In particular, the netlist describing the IC device may be provided as an external resource 75 to the computer system.

The processor 72 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 74. Memory 74 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 76 may include data storage devices such as a hard drive, optical drive, tape drive, non-volatile solid state device, or any other device capable of storing information. A database 764 may reside on the mass storage memory device 76, and may be used to collect and organize data used by the various systems and modules described herein.

Processor 72 may operate under the control of an operating system 726 that resides in memory 74. The operating system 726 may manage computing resources so that computer program code embodied as one or more computer software applications, such as an application 728 residing in memory 74, may have instructions executed by the processor 72. In an alternative embodiment, the processor 72 may execute the application 728 directly, in which case the operating system 726 may be omitted. One or more data structures 720 may also reside in memory 74, and may be used by the processor 72, operating system 726, and/or application 728 to store or manipulate data. In one embodiment, the SPOF data structure 111 may be included in the data structures block 720 of the memory 74.

When executed by the processor, the program code causes the processors to:
select a n-tuple of elements in at least the portions of the netlist corresponding to the sensitive functional blocks,
test each selected n-tuple of elements, the testing step comprising:
modifying the selected n-tuple of elements from an initial state to a testing state;
determining if the derivative of the Boolean function associated with each sensitive functional block is equal to zero.

The processor 72 is further caused to detect that the n-tuple represents a Point Of Failure of order n in the integrated circuit (IC) device if the Boolean function associated with the sensitive functional block is equal to zero.

The I/O interface 73 may provide a machine interface that operatively couples the processor 32 to other devices and systems, such as the network 71 and/or external resource 75. The application 728 may thereby work cooperatively with the network 712 and/or external resource 75 by communicating via the I/O interface 73 to provide the various features, functions, applications, processes, and/or modules comprising embodiments of the invention. The application 728 may also have program code that is executed by one or more external resources 75, or otherwise rely on functions and/or signals provided by other system or network components external to the computer 700. Indeed, given the various hardware and software possible configurations, persons having ordinary skill in the art will understand that embodiments of the invention may include applications that are located externally to the computer 700, distributed among multiple computers or other external resources 75, or provided by computing resources (hardware and/or software) that are provided as a service over the network 71, such as a cloud computing service.

The HMI 740 may be operatively coupled to the processor 72 of computer 700, in a known manner, to allow a user of the computer 700 to interact directly with the computer 700. The HMI 740 may include video and/or alphanumeric displays, a touch screen, a speaker, and any other suitable audio and visual indicators capable of providing information to the user. The HMI 740 may also include input devices and controls such as an alphanumeric keyboard, a pointing device, keypads, pushbuttons, control knobs, microphones, etc., capable of accepting commands or input from the user and transmitting the entered input to the processor 72.

Additional advantages and modifications will readily appear to those skilled in the art. The invention in its broader aspects is therefore not limited to the specific details, representative methods, and illustrative examples shown and described.

The invention claimed is:

1. A device for detecting Points Of Failure in an integrated circuit, the integrated circuit device being described by a structural description of the integrated circuit comprising a plurality of elements, said elements representing cells and wires interconnecting the cells, the structural description of the integrated circuit further comprising portions representing a set of sensitive functional blocks, each sensitive functional block comprising one or more inputs, at least one sensitive output, and a set of elements interconnected such that the value of the sensitive output is a Boolean function of the input values of the sensitive functional block, wherein the device comprises:
a selection unit configured to iteratively select a n-tuple of elements in at least the portions of the structural description of the integrated circuit corresponding to said sensitive functional blocks,
a testing unit configured to test each selected n-tuple of elements, the testing unit being configured to:
modify said selected n-tuple of elements from an initial state to a testing state;
determine if the derivative of the Boolean function associated with each sensitive functional block is equal to zero, the device being configured to detect that said n-tuple represents a Point Of Failure of order n in the integrated circuit device if the Boolean function associated with said sensitive functional block is equal to zero.

2. The device of claim 1, wherein the testing unit is configured to modify said selected n-tuple of elements by performing at least an action in the group consisting of: removing the n-tuple of elements, and maintaining the n-tuple of elements to a predefined binary value.

3. The device of claim 1, wherein the testing unit is configured to store information related to the n-tuple of elements, if the derivative of the Boolean function associated with said sensitive functional block is equal to zero.

4. The device of claim 1, wherein the testing unit is configured to modify back said selected n-tuple of elements from the testing state to the initial state, before selection of another n-tuple of elements.

5. The device of claim 1, comprising a data structure for storing information related to the tested n-tuple elements, said data structure comprising an entry for each n-tuple element.

6. The device of claim 5, wherein said information related to each n-tuple elements comprises the path of each n-tuple element, in the structural description of the integrated circuit.

7. The device of claim 1, comprising an injector configured to determine the type of each sensitive functional block comprised in the structural description of the integrated circuit, the injector being configured to insert testing elements in the portions of the structural description of the integrated circuit corresponding to a sensitive functional block depending on the type of the sensitive functional block, which provides a modified structural description of the integrated circuit, said injector being configured to transmit the modified structural description to the selection unit for the selection of a n-tuple element.

8. The device of claim 7, wherein, if the sensitive functional block represents a digital sensor comprising chain of buffers, the injector is configured to force a state configured to invert said chain of buffers in the portion of the structural description corresponding to said sensitive functional block.

9. The device of claim 1, wherein the selection unit comprises a parser to parse at least the portions of the structural description corresponding to the sensitive functional blocks.

10. The device of claim 9, wherein the selection unit is configured to parse said portions of the structural description corresponding to the sensitive functional blocks by applying a breadth-first traversal to said portions.

11. The device of claim 1, wherein said structural description is chosen in the group consisting of a Gate Level Netlist, an IC Layout description, and a Transistor Level Netlist.

12. A designing apparatus for designing an Integrated Circuit device, said apparatus comprising:
a behavioural description generator configured to determine a behavioural description of the IC device from a model of the IC device;
a Gate Level netlist generator configured to generate a Gate Level Netlist from a model of the behavioural description;
a placer-router configured to place and route cells to determine a physical layout of the IC device
a transistor level Netlist generator configured to extract a Transistor Level Netlist comprising transistors and connections from said layout,
wherein the apparatus comprises a device according to claim 1 for detecting the Points Of Failures from a structural description derived from at least one of the gate level Netlist, the layout description file, the transistor level Netlist, the design apparatus being configured to modify said model in response to the detection of at least one Point Of Failure.

13. An integrated circuit verification apparatus for verifying at least one Integrated Circuit, said apparatus comprising:
a structural description extractor configured to extract a structural description of the IC device,
wherein the apparatus comprises a device according to claim 1 for detecting Points Of Failures in the Integrated Circuit from said extracted description file.

14. A method for detecting Points Of Failure in an integrated circuit, said integrated circuit device being described by a structural description comprising a plurality of elements, said elements comprising cells and wires interconnecting the cells, the structural description further comprising portions representing a set of sensitive functional blocks, each sensitive functional block comprising one or more inputs, at least one sensitive output, and a set of elements interconnected such that the value of the sensitive output is a Boolean function of the input values of the sensitive functional block, wherein the method comprises at least one iteration of the following:
selecting n-tuple of elements in at least the portions of the structural description corresponding to said sensitive functional blocks,
testing each selected n-tuple of elements, said testing step comprising:
modifying said selected n-tuple of elements from an initial state to a testing state;
determining if the derivative of the Boolean function associated with each sensitive functional block is equal to zero,
the method detecting that said n-tuple represents a Point Of Failure of order n in the integrated circuit device if the Boolean function associated with said sensitive functional block is equal to zero.

15. A computer program product for detecting Points Of Failure in an integrated circuit, said integrated circuit device being described by a structural description comprising a plurality of elements, said elements comprising cells and wires interconnecting the cells, the structural description further comprising portions representing a set of sensitive functional blocks, each sensitive functional block comprising one or more inputs, at least one sensitive output, and a set of elements interconnected such that the value of the sensitive output is a Boolean function of the input values of the sensitive functional block, the computer program product comprising:
a non-transitory computer-readable storage medium; and
program code stored on the non-transitory computer-readable storage medium that, when executed by one or more processors, causes the one or more processors to:
select a n-tuple of elements in at least the portions of the structural description of the integrated circuit corresponding to said sensitive functional blocks,
test each selected n-tuple of elements, said testing step comprising:
modifying said selected n-tuple of elements from an initial state to a testing state;
determining if the derivative of the Boolean function associated with each sensitive functional block is equal to zero,
the one or more processors being further caused to detect that said n-tuple represents a Point Of Failure of order n in the integrated circuit device if the Boolean function associated with said sensitive functional block is equal to zero.

* * * * *